Dec. 3, 1957   L. L. KRASNOW   2,815,052
HINGED WORK CLAMP
Filed Feb. 16, 1955   2 Sheets-Sheet 2
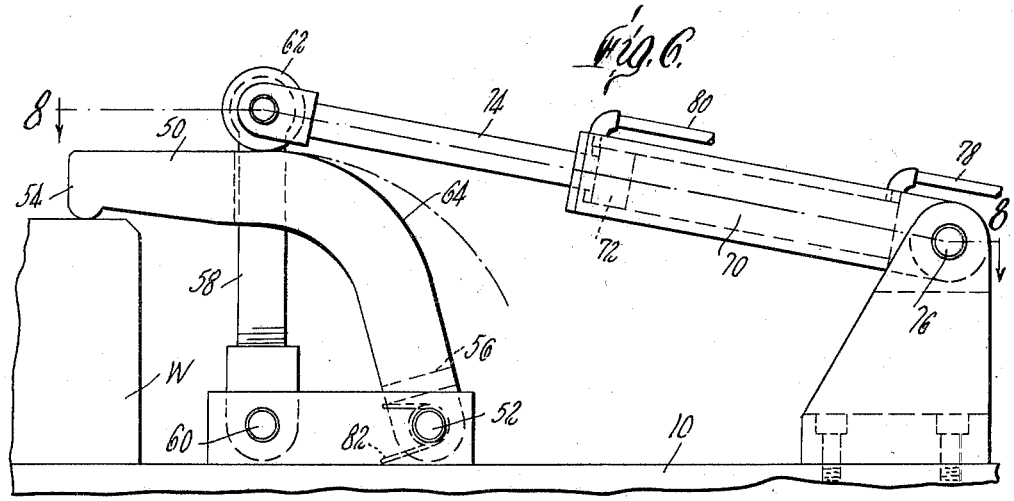
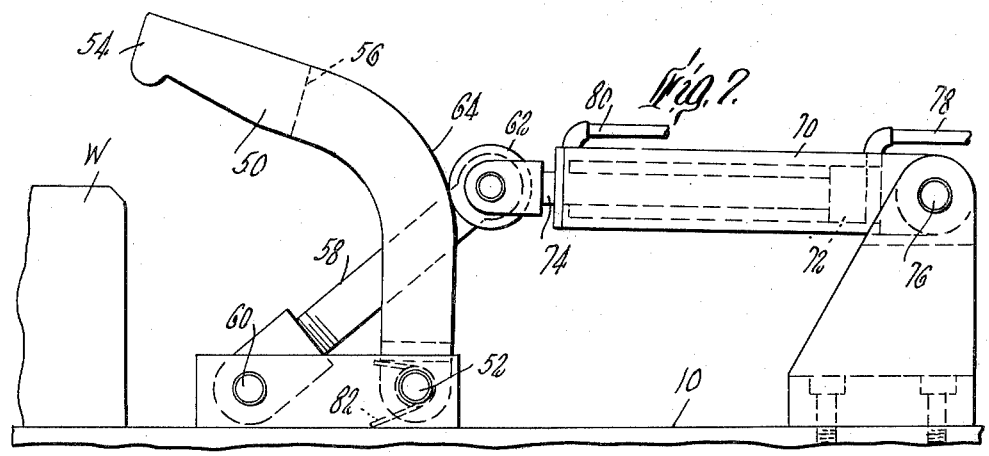
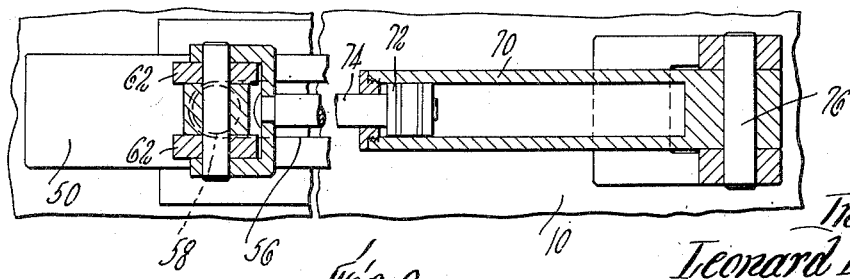
Inventor
Leonard L. Krasnow
by Wright, Brown,
Quinby & May
Attys

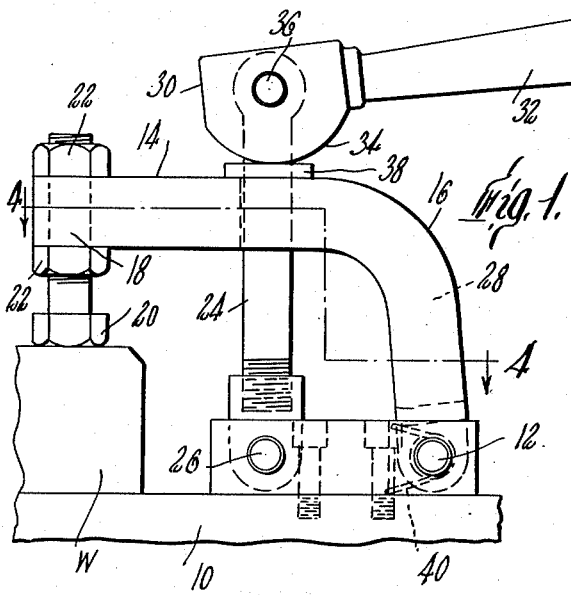

United States Patent Office 2,815,052
Patented Dec. 3, 1957

2,815,052

HINGED WORK CLAMP

Leonard L. Krasnow, Worcester, Mass., assignor to Lodding Engineering Corporation, Worcester, Mass., a corporation of Massachusetts Application February 16, 1955, Serial No. 488,637

2 Claims. (Cl. 144—290)

This invention relates to a clamping device to hold a workpiece firmly in place on a machine tool or the like and to release the workpiece quickly and easily when desired. According to the invention a clamping jaw is hinged to the bed or frame of a machine tool so that it can be swung quickly to or from a workpiece. When the jaw is in contact with the workpiece, or nearly so, the device is then operative to employ a large mechanical advantage in pressing the jaw strongly on the workpiece so as to anchor it firmly on the machine tool during an operation thereon. For the operation of the jaw member an auxiliary member is hinged to the bed near the jaw member and, as hereinafter described, is so related to the jaw member that rocking movement of the auxiliary member rocks the jaw member into its operative position in contact with the workpiece.

Various embodiments of the invention are illustrated on the drawings, of which:

Figure 1 is a side elevational view of a clamping device embodying the invention;

Figure 2 is a front elevation of the same;

Figure 3 is a side elevation of the device shown in Figure 1, the parts being in a different position of operation;

Figure 4 is a section on the line 4—4 of Figure 1;

Figure 5 is a fragmentary detail of a modified form of the invention;

Figure 6 is a side elevation of a power-operated form of clamping device;

Figure 7 is similar to Figure 6 but with the parts in a different position of operation; and Figure 8 is a section on the line 8—8 of Figure 6.

A support means 10 for the workpiece W may be a part of the bed or frame of a machine tool. A workpiece is placed at a predetermined location on the support 10 so that it will be properly related to the tool (not shown) which is to operate on it. Hinged to the support 10 as at 12 is an elongated jaw member 14 which is in the form of a bar extending upward from the hinge 12 and being bent to curve as at 16 toward the workpiece so that its end portion 18, or a contact member 20 carried thereby, bears on the workpiece W when the jaw member 14 has been rocked toward the workpiece to the position shown in Figure 1. The support means 10 and the jaw member 14 thus constitute a clamp to grip the workpiece and hold it in position to be operated on. The contact member may be a bolt passing through the end portion of the jaw member 14 and secured thereto in adjusted position by nuts 22.

To operate the clamp, an actuating member 24 is hinged at one end, as at 26, to the support 10. As shown, this member is a rod extending from the hinge 26 through a longitudinal slot 28 in the curved portion 16 of the jaw member 14, this slot also extending down nearly to the hinge 12. On the end portion of the member 24 which projects beyond the slot 28 is pivotally mounted a cam member 30 with a handle 32 attached. The cam member straddles the adjacent portion of the member 24 and has two similar cam edges 34 (Figure 2) which are eccentrically curved with respect to the rocking axis 36 of the cam member 30. The cam edges 34 may bear directly on the convex surfaces of the curved portion 16 of the jaw member 14 on either side of the slot 28, or a washer 38 may be interposed between the cam member 30 and the jaw member 14 as shown. The contact element 20 can be adjusted and the virtual length of the actuating member 24 can be adjusted so that when the member 24 is rocked to its upright position, as shown in Figure 1, the contact element 20 will bear on a workpiece on the base 10. If then the cam member 30 is rocked by manipulation of the handle 32 to the position shown in Figure 1, the eccentric cam edges 34 will press the washer 38 strongly against the jaw member to hold the contact element 20 tightly against the top of the workpiece so as to grip it between the element 20 and the support 10. When the jaw member 14 is in its clamping position as shown in Figure 1, the convex side of the curved portion 16 has a high part which is more distant from the axis of the hinge 26 of the actuating member than are the portions of the convex side adjacent thereto. When therefore the actuating member 24 is swung up from the idle position shown in Figure 3 to the operative position shown in Figure 1, the washer 38 must be free to move far enough out on the member 24 to pass the high part of the convex side of the jaw member 14. When the actuating member 24 reaches the upright position shown in Figure 1, the washer 38 will have to be pressed down against the jaw member 14 before the jaw member can clamp the work-piece.

At the conclusion of the operation on the workpiece, the latter can be released by rocking the cam member 30 to the position relative to the actuating member 24 shown in Figure 3. This relieves the pressure on the jaw member 14 and makes it easy to rock the actuating member to the position shown in Figure 3. A suitable spring 40 is provided at the hinge 12 to tend to rock the jaw member 14 away from the workpiece. When the actuating member 24 is rocked away from the workpiece the jaw member is rocked by the spring 40 to the position shown in Figure 3, lifting the contact element 20 clear of the workpiece to facilitate the removal of the workpiece and its replacement by another. The actuating member 24 is then rocked toward the workpiece and the cam member 30 riding on the convex surfaces of the curved portion 16 of the jaw member 14 rocks the latter to bring the contact element 20 to bear on the workpiece.

Instead of the cam member 30 with its eccentric cam edges, other forms of cam members can be employed. For example, the outer end portion of the actuating member 24 may be screw-threaded and a cap nut 42 may be mounted thereon. When the member 24 has been rocked to rock the jaw member to its work-engaging position, the cap nut 42 is manually turned to force the jaw member and its work-engaging end to press on the workpiece. Instead of the cap nut shown, an ordinary hexagonal nut similar to the nuts 22 can be employed if a wrench is available.

Figures 6 to 8 show a modified form of the invention which is power-actuated. On the base 10 an elongated jaw member 50 is hinged at 52. This jaw member is generally similar to the member 14 shown in Figure 1, having a work-engaging end 54 the details of which are optional and a longitudinal slot 56 through which extends an actuating member 58. The latter is hinged to the base 10 at 60 between the hinge 52 and the location of the workpiece. At the free end of the actuating member 58 are a pair of rollers 62 which ride on the convex surface 64 of jaw member 50 on either side of the slot 56. When the member 58 is rocked about its hinge axis, the rollers 62 describe a circular arc. The convex surface 64 is so shaped that when the member 58 rocks toward the work, the rollers 62 which bear on this surface first swing the jaw member toward the work until the end 54 engages the workpiece, then exerts a greatly stepped-up mechanical advantage to press the end 54 down on the workpiece. If the shape of the cam edge 64 be compared with the path of the rollers 62 as indicated in Figure 6 by a dotted arc, it will be seen that the lower portion of the cam edge rapidly converges toward the path of the rollers whereas the upper portion converges toward the roller path gradually. This is equivalent to a wedge which starts with a relatively steep pitch angle which diminishes rapidly to a small angle.

The actuating member 58 may be manually operated or, as shown, may be power-operated by suitable means such as a pneumatic motor consisting of a cylinder 70 in which a piston 72 is reciprocable, the piston being connected by a rod 74 to the end of the member 58. The cylinder is hinged at 76 and air or liquid is supplied through a tube 78 from a suitable source, not shown, to advance the piston, and through a tube 80 to retract the piston. When the piston is retracted to rock the member 58 away from the workpiece, a spring 82 rocks the jaw member 50 clear of the workpiece to the position shown in Figure 7.

I claim:

1. A clamping device for a workpiece comprising a horizontal bed adapted to support a workpiece thereon, a free-ended generally L-shaped jaw member, means pivoting said jaw member adjacent an end thereof relative to said bed at a point spaced from the locus of the workpiece to be clamped, said jaw member including a curved portion and a jaw portion extending from said curved portion to a point adjacent the work location, said jaw portion being adapted to bear upon the work, an actuating member hinged with relation to said bed at a point between the location of the work and the pivot axis of the jaw member, said actuating member extending past said jaw member and being swingable in the plane thereof, manually operable element on the outer end of said actuating member to press the jaw portion of the jaw member against the workpiece in clamping engagement therewith, and means associated with said L-shaped jaw member preventing swinging of the actuating member in a work-releasing direction toward the pivot axis of the jaw member in the absence of positive operation of said manually operable element to release the same from the jaw member, said means including a part of the curved portion of said L-shaped jaw member located at a greater distance from the pivot axis of the actuating member than the distance from said pivot axis to the point on the jaw portion engaged by said manually operable element, said manually operable element riding on the L-shaped jaw member and being held against motion in the work-releasing direction by said part of the curved portion of the jaw member.

2. The clamping device of claim 1 wherein the manually operable element on the actuating member includes a nut that engages the jaw member.

References Cited in the file of this patent

UNITED STATES PATENTS

| | | |
|---|---|---|
| 591,421 | Palmer et al. | Oct. 12, 1897 |
| 687,177 | Caldwell | Nov. 19, 1901 |
| 1,060,477 | Meyers | Apr. 29, 1913 |
| 1,063,838 | Shaw | June 3, 1913 |
| 2,157,345 | Nelson | May 9, 1939 |
| 2,456,100 | Wood | Dec. 14, 1948 |
| 2,537,594 | Lehman | Jan. 9, 1951 |
| 2,545,668 | Merriman | Mar. 20, 1951 |